US012703823B2

(12) United States Patent
Trias et al.

(10) Patent No.: US 12,703,823 B2
(45) Date of Patent: Aug. 11, 2026

(54) WELL CLEAN PREMIUM (WCP-1) SYSTEM AND METHOD

(71) Applicant: Hygt Chemical LLC, McAllen, TX (US)

(72) Inventors: Hernan Jorge Trias, Buenos Aires (AR); Eduardo Alberto Gomez, McAllen, TX (US)

(73) Assignee: Hygt Chemical LLC, McAllen, TX (US)

( * ) Notice: Subject to any disclaimer, the term of this patent is extended or adjusted under 35 U.S.C. 154(b) by 57 days.

(21) Appl. No.: 18/886,934

(22) Filed: Sep. 16, 2024

(65) Prior Publication Data

US 2025/0092304 A1 Mar. 20, 2025

Related U.S. Application Data

(60) Provisional application No. 63/538,646, filed on Sep. 15, 2023.

(51) Int. Cl.

| | |
|---|---|
| ***C09K 8/86*** | (2006.01) |
| ***C09K 8/524*** | (2006.01) |
| ***C09K 8/54*** | (2006.01) |
| ***E21B 41/02*** | (2006.01) |
| ***E21B 43/16*** | (2006.01) |

(52) U.S. Cl.

CPC ................ *C09K 8/86* (2013.01); *C09K 8/524* (2013.01); *C09K 8/54* (2013.01); *E21B 41/02* (2013.01); *E21B 43/16* (2013.01); *C09K 2208/30* (2013.01); *C09K 2208/32* (2013.01)

(58) Field of Classification Search

CPC ........................................................ C09K 8/34

See application file for complete search history.

(56) References Cited

U.S. PATENT DOCUMENTS

2006/0205605 A1* 9/2006 Dessinges .............. C09K 8/887 507/211

2011/0111991 A1* 5/2011 Samuel .................... C09K 8/34 507/263

* cited by examiner

*Primary Examiner* — William D Hutton, Jr.

*Assistant Examiner* — Avi T Skaist

(74) *Attorney, Agent, or Firm* — Kirby Drake

(57) ABSTRACT

A well clean premium (WCP-1) system may be injected directly into an oil and gas reservoir through a production pipeline. This may provide a high reactivity stimulation integral system for carbonated reservoirs to increase the hydrocarbon productivity and provide corrosive self-control. The WCP-1 system may provide a special blend of last generation additives (i.e., surfactant, tensoactives, and special catalyst) that may permit the stimulation execution with minimal risk. It may be compatible with nitrogen ($N_2$) applications where the bottom hole temperature may not be as relevant. Less volume may be required for a specific stimulation compared with standard acid systems, and it may not be necessary to add corrosion inhibitors to the WCP-1 system. Accordingly, minimal or no additives are needed within the system, conserving a high reactivity with the carbonates. Excellent corrosion control also may be provided with no corrosion inhibitor needed when working with standard temperatures.

8 Claims, 5 Drawing Sheets

WELL CLEAN PREMIUM (WCP-1) SYSTEM AND METHOD

FIELD OF THE DISCLOSURE

The present disclosure generally relates to integral stimulating systems for oil and gas reservoirs, and more particularly to integral stimulating systems to solubilize carbonated petroleum reservoirs.

BACKGROUND

Standard reactive systems for oil and gas reservoirs may provide 3-4 months of production. These standard reactive systems also tend to use high volumes of corrosion inhibitor at temperatures greater than 100° Celsius. Further, these systems can be costly as they tend to require use of 10-12 additives in the formulations.

SUMMARY

Technologies that may upgrade value, drive down costs, and reduce environmental impacts may have the greatest effect on increasing hydrocarbon production worldwide. To increase production, it may be necessary to induce conductivity to the reservoir, an important condition that is not present in compact reservoirs. A well clean premium (WCP-1) system according to embodiments of the present disclosure may be highly versatile and can be used to stimulate carbonated reservoirs with excellent corrosion control. This may provide innovative drilling, completion, stimulation, and/or monitoring techniques that may help make carbonate reservoirs more profitable assets.

Embodiments of the present disclosure may provide integral stimulating systems for oil and gas reservoirs, which also may be referred to as well clean premium (WCP-1) in embodiments of the present disclosure. Integral stimulating systems according to embodiments of the present disclosure may solubilize carbonated petroleum reservoirs. These systems may provide productive longevity of one or more years. Further, these systems may be constituted with a plurality of additives in an integral way, eliminating or at least reducing the need to use metal corrosion inhibitor up to temperatures of 180° Celsius. Moreover, systems according to embodiments of the present disclosure may be formulated with five integral basic additives, thereby providing a noticeable reduction in system cost.

The WCP-1 system may be used as an intelligent stimulating system providing various advantages including, but not limited to, direct application to deposits of carbonates and dolomites reservoirs, oil or gas, use in clean stimulation, matrix and acid fracturing operations, stoichiometric behavior similar to a 15% acid system (15% HCl), no need for corrosive control or low inhibition requirement (as its corrosive rate is well below the limit established by the API), controlled reaction rate (velocity) with formations, ability to induce larger invasion radius (radial penetration) into treated reservoirs, better expectations of post-stimulation production, simple logistics, injection by production tubing or coiled tubing, and/or compatibility with $N_2$, brines, oil and gas.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
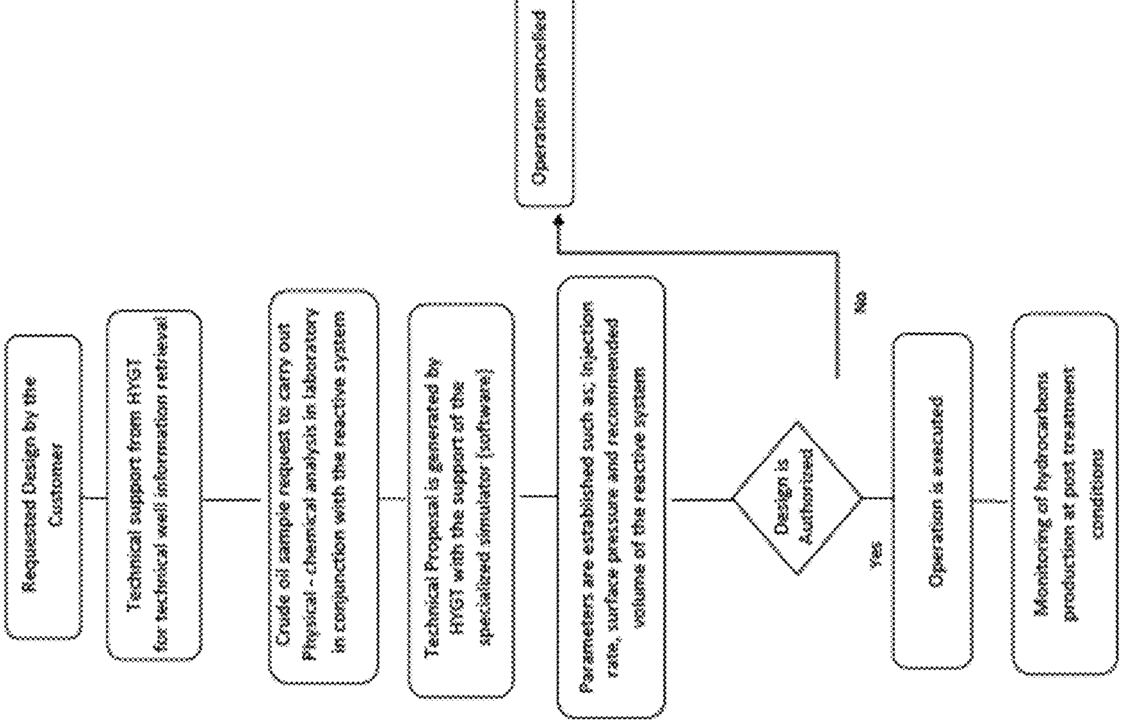
FIG. 1 depicts a flow chart to obtain information on the candidate reservoir to stimulate with WCP-1 and how the respective design is prepared after carrying out the corresponding laboratory tests and at the end the monitoring in the operation is indicated according to an embodiment of the present disclosure.

Embodiments of the present disclosure may provide a well clean premium (WCP-1) system that may be injected directly into an oil and gas reservoir through a production pipeline, which may be tubing, production pipe, casing pipe, and/or coiled tubing. This may provide a high reactivity stimulation integral system for carbonated reservoirs (i.e., limestones and dolomites) to increase the hydrocarbon productivity and provide corrosive self-control in embodiments of the present disclosure. The WCP-1 system may provide a special blend of last generation additives (i.e., surfactant, tensoactives, and special catalyst) that may permit the stimulation execution with minimal risk. It can be injected through production strings (tubing) or coiled tubing in embodiments of the present disclosure, and it may be compatible with nitrogen ($N_2$) applications where the bottom hole temperature may not be as relevant. It should be appreciated that less volume may be required for a specific stimulation compared with standard acid systems, and it typically may not be necessary to add corrosion inhibitors to the WCP-1 system in embodiments of the present disclosure. Accordingly, minimal or no additives are needed within the system, thereby conserving a high reactivity with the carbonates. Excellent corrosion control also may be provided with no corrosion inhibitor needed when working with standard temperatures.

The WCP-1 system according to embodiments of the present disclosure may provide a balanced formulation of stabilized surfactants and tensoactive agents that may contain a last-generation catalyst that may ensure the least damage to the pipes and pumps used (metals). At the standard temperatures, the WCP-1 system may not require the addition of a corrosive external inhibitor, or it may be used in minimal proportion. It may be used in joint operations with coiled (flexible) tubing using nitrogen gas as optional support. Embodiments of the present disclosure may provide a WCP-1 system comprising a viscoelastic surfactant (approximately 25-30%), a compound based on organic molecules, humectant, capillary pressure and surface tension reducers (approximately 10-15%), a catalyst as a chemical reaction rate controller (8%), aminomethanamide (approximately 30-35%), quaternary ammonium salt (approximately 5-8%), and water (approximately 12-20%). In an embodiment of the present disclosure, the WCP-1 system may comprise alkyl dimethyl benzyl ammonium chloride (approximately 4-8%), hydrochloric acid (approximately 20-30%), urea (approximately 30-50%), citric acid anhydrous (approximately 2-4%), formic acid (approximately 2-4%), and water (approximately 10-20%). It should be appreciated that the percentage ranges are for application for hydrocarbon producing wells and associated injection wells in embodiments of the present disclosure. While certain system additives have been identified herein, it should be appreciated that other equivalent system additives may be used without departing from the present disclosure.

The WCP-1 system according to embodiments of the present disclosure may be a transparent liquid having a slightly yellow color. Solubility may be limited in water. There may be no metal corrosion effect until reaching approximately 150 degrees Celsius. It may have a specific gravity of 1.15 and pH of 1-3 in embodiments of the present disclosure. Soaking (impregnation) time may be approximately 8-12 hours depending on the bottom hole temperature.

The production pipeline used may vary depending on one or more factors including, but not limited to, the physical/mechanical conditions of the reservoir and/or the depth of the reservoir. It should be appreciated that the volume and injection rate associated with injection of the WCP-1 system may be determined using software that processes a variety of data including, but not limited to, the lithology of the reck, the mechanical state and/or construction of the well, pressures, temperature, and/or nature of damage present in the reservoir.

The WCP-1 system may be an effective option for solubilizing polymeric systems and polymers added to drilling and completion muds, which may induce a filter cake in the face of the production reservoir that the WCP-1 system dilutes. The system also may dilute polymers that damage reservoirs after being hydraulically fractured in sand compact reservoirs. This also is a polymeric damage that restricts the expected hydrocarbon production. The WCP-1 system also may dilute this polymeric damage in embodiments of the present disclosure.

Figure 2B:
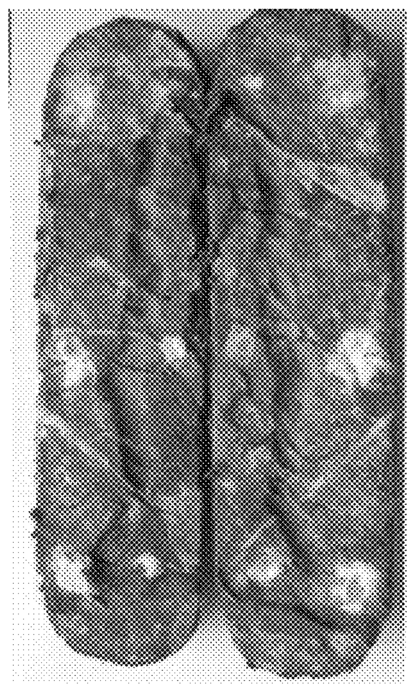
FIGS. 2A-2B depict conductive channels formed through matrix stimulation according to an embodiment of the present disclosure.
Figure 2A:
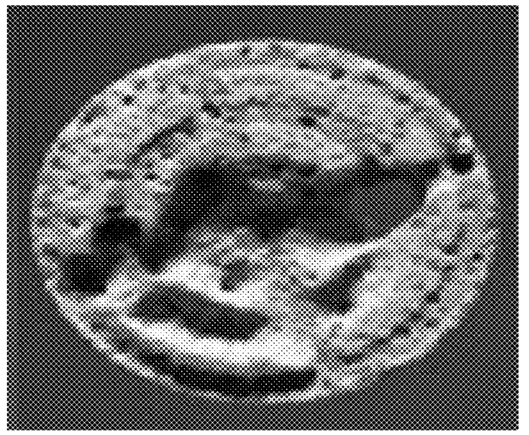

It should be appreciated that matrix stimulation methods can be applied in carbonate rocks. It may remove or bypass damage in the pore spaces and then may induce conductivity. This may be accomplished by dissolving material that is plugging the pores or by enlarging the pore spaces. In carbonates, matrix stimulation may create new, highly conductive channels (wormholes) that may bypass the damage, such as depicted in FIGS. 2A and 2B. FIGS. 2A-2B illustrate the creation of wormholes in the reservoir by the action of WCP-1. They may be the conduits through which the hydrocarbons from the reservoir will flow to the bottom of the well.

FIG. 1 depicts a flow chart to obtain information on the candidate reservoir to stimulate with WCP-1 and how the respective design is prepared after carrying out the corresponding laboratory tests and at the end the monitoring in the operation is indicated according to an embodiment of the present disclosure. As depicted herein, a design may be requested by the customer. Technical support may be provided for technical well information retrieval. There may be a crude oil sample request to carry out physical-chemical analysis in a laboratory in conjunction with the reactive system. A technical proposal may be generated with the support of a specialized simulator software. Parameters may be established including, but not limited to, injection rate, surface pressure, and/or recommended volume of the reactive system in embodiments of the present disclosure. Other considerations also may include stress formation (geomechanics), rock solubility, rock-fluid reactivity, system retardation, corrosion control, invasion radius, and/or conductivity generation. The design may then be authorized. If it is authorized, an operation may be executed whereby hydrocarbon production at post-treatment conditions may be monitored. If the design is not authorized, the operation may be canceled.

It should be appreciated that a maximum invasion radius may depend on a variety of factors including, but not limited to, natural permeability, stimulation fluid, formation lithology, rock-fluid reaction velocity, regional geomechanics, formation closure stress, and/or reservoir solubility. A stimulation fluid may be designed according to the lithologic conditions of the reservoir. The stimulation fluid must induce conductivity with an adequate invasion radius to eliminate damages present in the reservoir. The control corrosion is essential as a relevant property of the stimulating fluid.

Figures 3A, 3B, 3C:
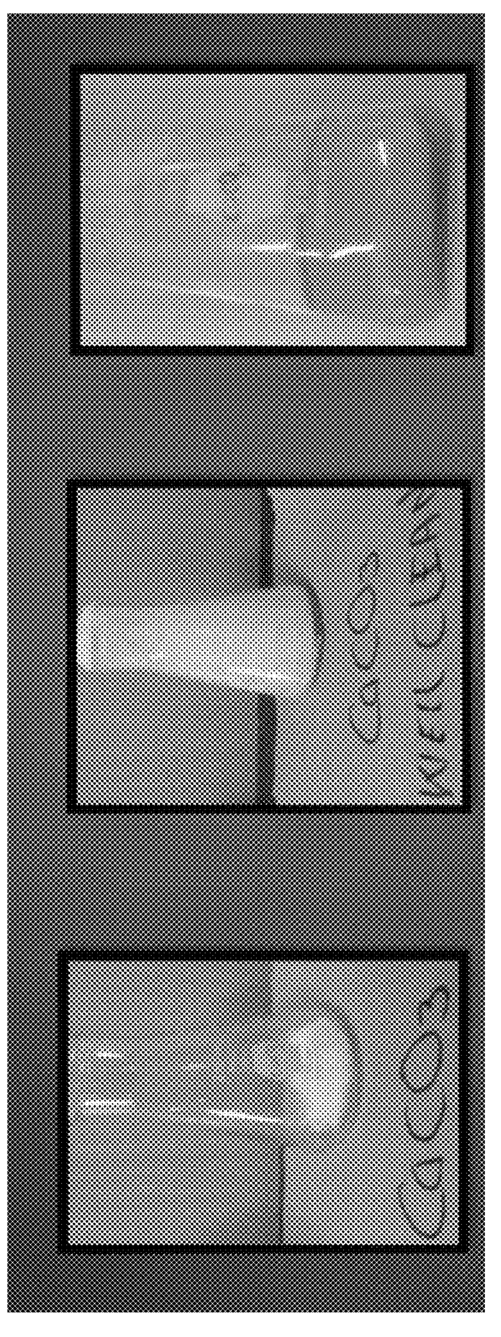
FIGS. 3A-3C depict results of a solubility test with calcium carbonate according to an embodiment of the present disclosure.

FIGS. 3A-3C depict results of a solubility test with calcium carbonate according to an embodiment of the present disclosure. The WCP-1 stimulating reagent system may react adequately (it is a laboratory test) with calcium carbonate $CaCO_3$, which is the main mineral of carbonate rocks. More specifically, FIG. 3A depicts calcium carbonate alone, FIG. 3B depicts the WCP system introduced into calcium carbonate (i.e., immediate reaction with calcium carbonate), and FIG. 3C depicts the combination of the WCP-1 system with calcium carbonate after 2 hours at bottom hole temperature.

Corrosion tests also were performed under API conditions and the results of such tests are depicted below:

Report Identification: I-LPHCC-CC-065-2022
Corrosive Effect of Acid Systems Employed in Stimulation Treatments
Test Conditions: Temperature: 180° C.; Pressure: 5000 lb/in$^2$, Exposure Time: 4 h.

| Acid System | Pipe Harrow | Acid system volume/exposed metal area ratio ($cm^3/in^2$) | Weight Loss (g) | Weight Loss ($lb/ft^2$) |
|---|---|---|---|---|
| Well Clean | TP 3½" N-80, | 23.74 | 0.103 7 | 0.007 |
| Premium 1 | 92 lb | 24.82 | 0.04 1 | 0.006 |
| (WCP-1) | TR 7⅝" TAC 110, | 18.83 | 0.115 7 | 0.006 |
| | 39 lb | 18.86 | 0.155 9 | 0.008 |
| | TP 4½" P110, | 19.02 | 0.101 6 | 0.005 |
| | 12.6 lb | 18.73 | 0.104 2 | 0.005 |

Figure 4:
FIG. 4 depicts skin reduction test results according to an embodiment of the present disclosure.
Figure 5:
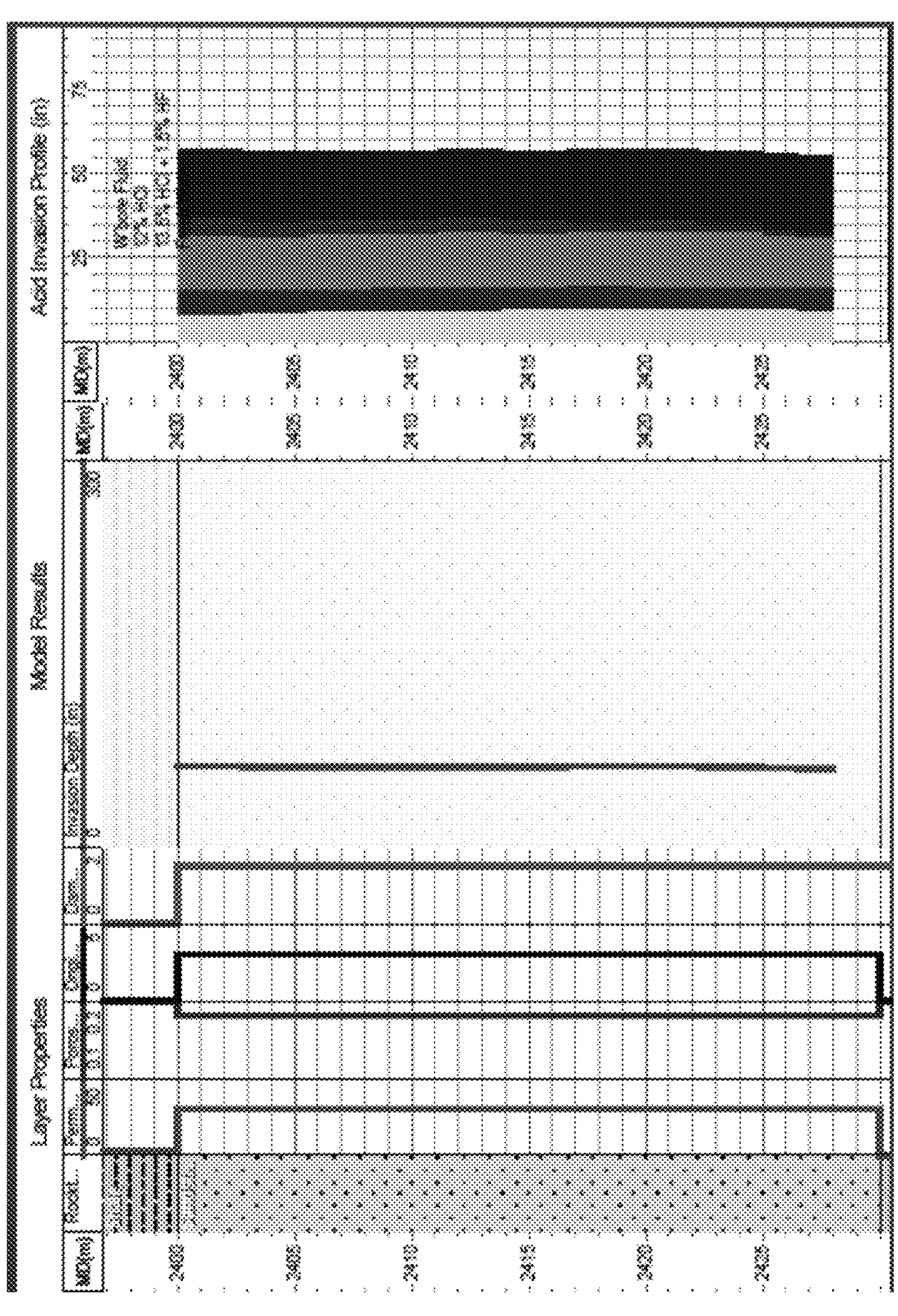
FIG. 5 depicts a penetration figure of the WCP-1 system in the reservoir which will favor the increase in hydrocarbon production of the stimulated reservoir according to an embodiment of the present disclosure.

Skin (damage factor) reduction also was evaluated. Skin reduction may impact hydrocarbon production. FIG. 4 depicts skin reduction test results according to an embodiment of the present disclosure. In the simulator, it is clearly observed how the WCP-1 system eliminates formation damage, changing the present damage from positive to negative, increasing the production of hydrocarbons from the treated reservoir. The pumping flow rate (bpm), acid concentration (% mass) and total post-treatment skin are depicted therein. FIG. 5 depicts a penetration figure of the WCP-1 system in the reservoir which will favor the increase in hydrocarbon production of the stimulated reservoir. This may reflect the relevance of fluid stimulation invasion within the reservoir. Layer properties are provided along with model results and acid invasion profile (in) also is provided.

It should be appreciated that the rate injection may depend on the stimulation technical design (i.e., matrix conditions) as well as under pressure limits of the wellhead, casings, tubings, and packers in embodiments of the present disclosure. The concentration may be from 200-1000 ppm in embodiments of the present disclosure. It should be appreciated that the WCP system may be diluted with water without departing from the present disclosure.

Various advantages may be provided as an integral and intelligent stimulation system. It may provide direct application to carbonated reservoirs (limestones and dolomites) that may be saturated with oil and natural gas. It can be used in cleaning jobs, matrix stimulation, or acid frac jobs. The stoichiometric performance may be similar to a 15% hydrochloric acid. There may be minimal or no need to use a corrosion inhibitor. It may reach the API corrosion standard requirement without use of a corrosion inhibitor in embodiments of the present disclosure. There may be a controlled reaction rate with the formation and a high invasion radius within the reservoir. Excellent production response at post-stimulation conditions may be provided. It can be injected by production string (tubing) and coiled tubing as a cleaning instrument below reservoir fracture conditions. It also may be suitable for low, medium, and high bottom hole reservoir temperature conditions, and it may be compatible with nitrogen ($N_2$).

Injection in the field may be provided using a high-pressure unit with 2 and 3-inch injection lines. A trailer truck having 20-30 $m^3$ capacity may be used, and coiled tubing and nitrogen may be optional.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A well clean premium (WCP-1) system comprising:

a formulation of a viscoelastic surfactant, a compound based on organic molecules, humectant, capillary pressure and surface tension reducers, a catalyst, aminomethanamide, quaternary ammonium salt, and water injected directly into an oil and gas reservoir through a production pipeline, thereby providing a high reactivity stimulation integral system for carbonated reservoirs to increase hydrocarbon productivity and provide corrosive self-control.

2. The WCP-1 system of claim 1, the formulation comprising:

approximately 25-30% of the viscoelastic surfactant, approximately 10-15% of the compound based on organic molecules, humectant, capillary pressure and surface tension reducers, 8% of the catalyst, approximately 30-35% of aminomethanamide, approximately 5-8% quaternary ammonium salt, and approximately 12-20% water.

3. The WCP-1 system of claim 1, wherein the production pipeline comprises at least one of the following:

tubing, production pipe, casing pipe, and/or coiled tubing.

4. The WCP-1 system of claim 1, wherein the WCP-1 system contains no corrosive external inhibitor.

5. The WCP-1 system of claim 1, wherein the formulation is a transparent liquid having a yellow color.

6. The WCP-1 system of claim 1, wherein the formulation has no metal corrosion effect until reaching approximately 150 degrees Celsius.

7. The WCP-1 system of claim 1, wherein the formulation has a specific gravity of 1.15 and pH of 1-3.

8. The WCP-1 system of claim 1, wherein the system solubilizes solubilizing polymeric systems and polymers added to drilling and completion muds, which induces a filter cake in the oil and gas reservoir that the WCP-1 system dilutes.

* * * * *